United States Patent [19]
Gardner et al.

[11] 3,740,058
[45] June 19, 1973

[54] FORWARD SEALING ASSEMBLY FOR STERN TUBES

[75] Inventors: Willis W. Gardner, Waukesha; Richard L. Rafferty, Menomonee Falls, both of Wis.

[73] Assignee: Waukesha Bearings Corporation, Waukesha, Wis.

[22] Filed: July 26, 1971

[21] Appl. No.: 165,891

Related U.S. Application Data

[63] Continuation-in-part of Ser. No. 10,915, Feb. 12, 1970, abandoned.

[52] U.S. Cl. .......................... 277/15, 277/27, 277/59
[51] Int. Cl. ..................... F16j 15/16, F16j 15/40
[58] Field of Search .................. 277/3, 27, 15, 58, 277/59, 18

[56] References Cited
UNITED STATES PATENTS

| | | | |
|---|---|---|---|
| 3,478,648 | 11/1969 | D'Alba | 277/15 X |
| 3,414,274 | 12/1968 | Aronson | 277/15 |
| 3,088,744 | 5/1963 | Ezekiel et al. | 277/15 X |
| 1,323,474 | 12/1919 | Hodgkinson | 277/32 X |

Primary Examiner—Samuel B. Rothberg
Attorney—Arthur L. Morsell, Jr. and Curtis B. Morsell, Jr.

[57] ABSTRACT

An annular casing which surrounds the tail shaft of a ship at the forward end of the stern tube has a first annular pocket within which a flexible annular lip seal is supported for sealing around the tail shaft liner. Aft of the seal, in another annular pocket which communicates with the oil chamber in the stern tube, is a floating ring having restricted clearance around the liner. A pump draws oil from the first pocket, causing oil to be drawn from the stern tube oil chamber through the restricted clearance space and the said first annular pocket, this oil being pumped back into the stern tube oil chamber. A pressure regulating valve is connected in parallel with the pump to maintain a substantially constant circulating pressure. A desired reduced pressure is thus maintained adjacent the seal to reduce the pressure difference across the seal lip.

9 Claims, 3 Drawing Figures

PATENTED JUN 19 1973
3,740,058
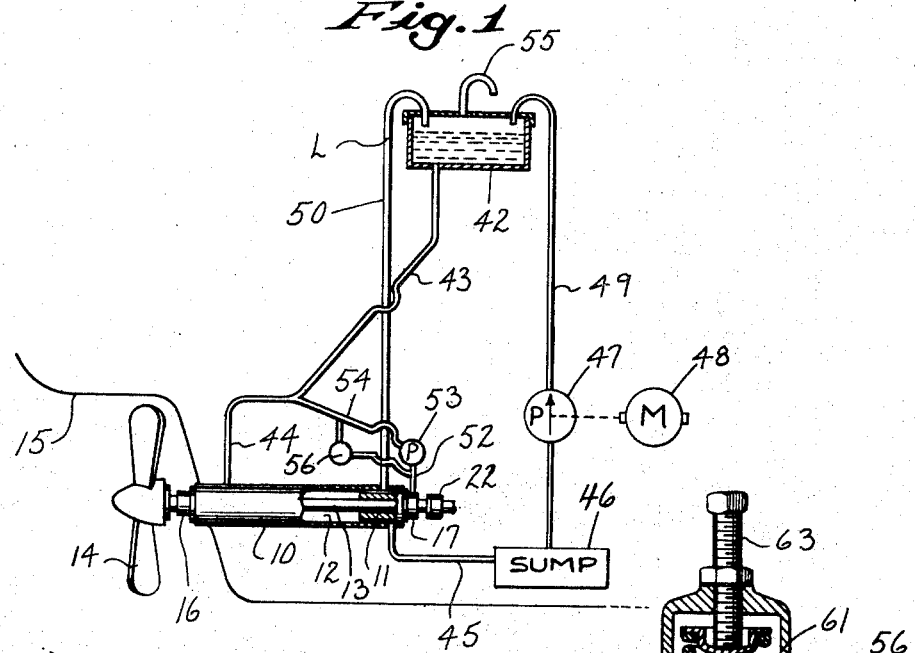
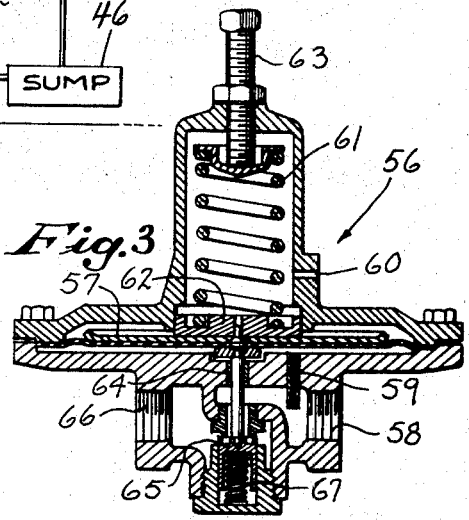
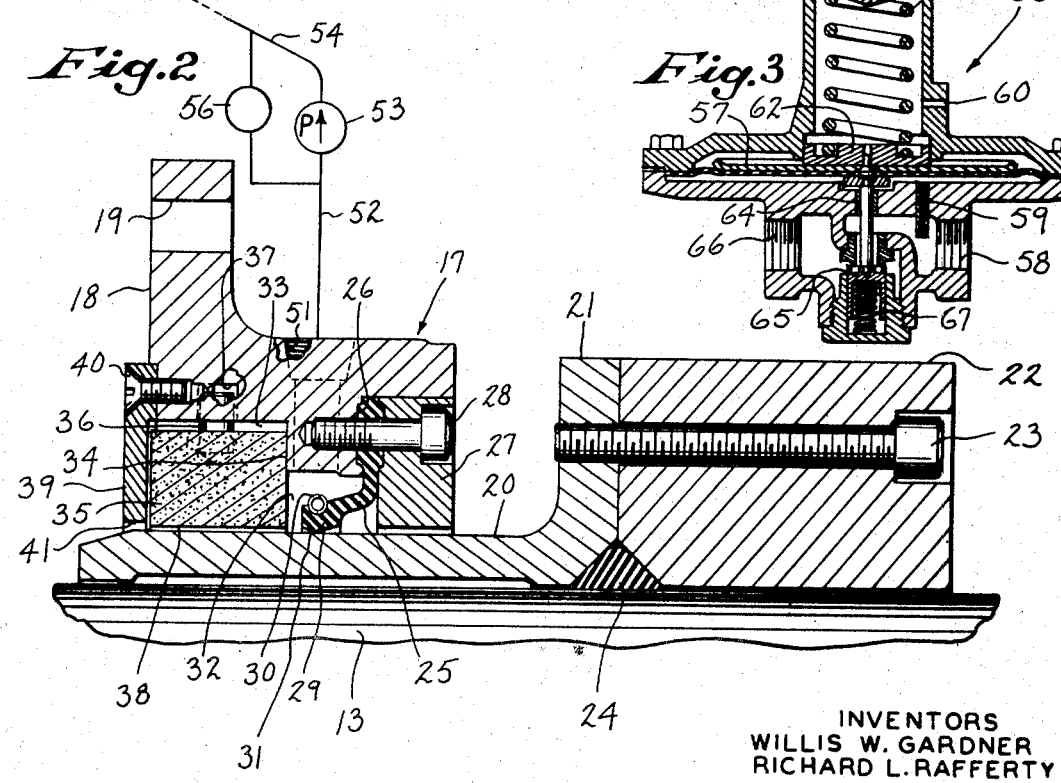
INVENTORS
WILLIS W. GARDNER
RICHARD L. RAFFERTY
BY
Morsell & Morsell
ATTORNEYS

FORWARD SEALING ASSEMBLY FOR STERN TUBES

This application is a Continuation-in-part of our co-pending application Ser. No. 10,915, and now abandoned, which was filed on Feb. 12, 1970, for a "Forward Sealing Assembly for Stern Tubes."

BACKGROUND OF THE INVENTION

1. Field of the Invention

The present invention is particularly suitable for use in connection with stern tube sealing on large ships, and is more particularly concerned with a sealing assembly at the forward end of the stern tube which seals against the loss of oil from the stern tube.

2. Description of the Prior Art

While radial lip seals are desirable for the purpose of the present invention they have a certain disadvantage in that there is a maximum pressure difference on the two sides of the seal which can be handled by a single sealing element. If this limitation is exceeded there is deformation of the flexible portions of the lip seal so that undesirably large contact areas can develop between the seal lip and the rotating member. These large contact areas can generate increased amounts of heat, raising the seal operating temperature. Deterioration of the elastomer of the seal may then result, with attendant leakage and seal failure. This type of failure is usually a gradual development over a period of time. In ships, the pressure difference on the two sides of a forward stern tube seal is the difference between the pressure exerted by the oil in the stern tube and atmospheric pressure in the shaft alley. The stern tube oil pressure is maintained at a value slightly in excess of the sea water pressure at the level of the propeller shaft. This provides for a small pressure difference across the aft stern tube seal (which is favorable for its operation) and favors the loss of oil rather than the ingress of sea water should any leak develop. However, as the water pressure at shaft level can be substantially greater than atmospheric pressure inside the ship, a large pressure difference can exist across the forward stern tube seal, particularly on deep drafted ships. If this pressure difference is large, it can adversely affect the operation of the conventional lip type forward seal, as described above.

SUMMARY OF THE INVENTION

The improved invention provides novel means for maintaning the oil pressure on the forward seal at a desired level below the oil pressure in the stern tube whereby a reduced pressure difference is established across the lip seal ring thus insuring optimum life of the sealing element.

A general object of the present invention is to provide, in an annular pocket within which a forward stern tube seal is located, improved means for maintaining an oil pressure in said pocket which is lower than said existing in the main stern tube oil chamber.

A further object of the invention is to provide a sealing assembly as above described wherein there is a floating ring between the lip seal pocket and the forward end of the stern tube oil chamber, whereby the passage of oil from the stern tube chamber into said seal pocket is restricted, there being means for continuously drawing oil from the lip seal pocket at such a rate as to maintain a desired reduced oil pressure adjacent the seal.

A further object of the invention is to provide a sealing assembly which provides for lubricating and cooling of the forward seal, with recirculation of the oil to the main stern tube chamber.

A further object of the invention is to provide a forward sealing assembly which prevents the development of pressure differentials of the type which might create large contact areas between the seal lip and the rotating member.

A further object of the invention is to provide a sealing assembly which maintains minimum contact between the sealing lip and the rotating member to decrease the amount of generated heat and to reduce deterioration of the elastomer from which the sealing ring is formed.

With the above and other objects in view, the invention consists of the improved forward sealing assembly for stern tubes, and all of its parts and combinations, as set forth in the claims, and all equivalents thereof.

BRIEF DESCRIPTION OF THE DRAWINGS

In the accompanying drawings, illustrating one complete embodiment of the preferred form of the invention, in which the same reference numerals designate the same parts in all of the views:

FIG. 1 is a partially diagrammatic view showing the stern tube oil system, part of the stern tube being broken away and shown in longitudinal section;

FIG. 2 is a fragmentary longitudinal sectional view through a forward sealing assembly; and FIG. 3 is a longitudinal sectional view of the pressure regulating valve 56.

DESCRIPTION OF THE PREFERRED EMBODIMENTS

Referring more particularly to the drawings, the numeral 10 designates a stern tube having a forward bearing 11 and a similar aft bearing (not shown), there being an oil chamber 12 within the stern tube, and the tail shaft carrying the usual propeller 14 for a ship 15. Between the aft bearing and the propeller 14 is the casing 16 for the aft sealing assembly, which assembly includes lip seals, preferably the elastomeric radial lip type which are designed to retain oil within the stern tube and to resist entrance of sea water into the stern tube.

Forwardly of the forward bearing 11 is a casing 17 having a forward seal assembly, which assembly is also designed to retain the oil within the stern tube. This forward seal assembly forms the subject matter of the present invention and is illustrated more particularly in FIG. 2. The annular casing 17 has an annular flange 18 which is adapted to be secured by bolts through bolt holes 19 to the forward end of the stern tube, the casing 17 being positioned around a forward liner 20 which surrounds the tail shaft 13 and in effect forms a part thereof to rotate therewith. The liner has an annular flange 21 which is removably secured to one end of a clamping ring 22 by bolts 23, there being a seal 24 at the juncture between the clamping ring 22 and the end of the liner.

Within the casing 17 is an annular lip seal 25 of a type which is well-known and which is formed of a suitable elastomeric material such as rubber or synthetic rubber capable of retaining lubricating oil in the stern tube. It is preferably a copolymer of butediene and acrylonitrile such as Buna N. The lip seal has an outer peripheral portion which is removably secured between a shoulder 26 of the casing and a support ring 27 by bolts 28, which bolts extend through holes in the support ring and lip seal. The seal has an annular lip portion 29 which is urged by the usual garter spring 30 into sealing contact with the rotating liner. Desirably, this contact is a line contact at 31. The lip portion of the seal is located in a first annular pocket 32 of the casing 17.

Aft of the pocket 32 the casing 17 has a second annular pocket 33 of larger size and greater OD, there being an annular shoulder 34 between the first pocket 32 and the second pocket 33.

Within the second pocket 33 is a floating ring 35, which ring is formed of any suitable material but is preferably of bronze or a suitable plastic. The ring has pins 36 projecting radially therefrom which fit loosely in pinholes 37 in the casing 17. There is a restricted annular clearance 38 between the ID of the floating ring and the liner 20. The loose fit of the pins 36 in the pinholes 37 is such that the oil pressure in the stern tube oil chamber 12 will create a static seal between the forward face of the floating ring 35 and the shoulder 34. In addition, the ring 35 will float on oil in the restricted annular space 38. A retainer ring 39, which is secured to the aft face of the casing 17 by bolts 40, maintains the floating ring within the second annular pocket. There is also an annular clearance space 41 between the ID of the retainer ring 39 and the liner 20 whereby oil in the oil chamber 12 of the stern tube is in constant communication with the pocket 32 by way of the annular spaces 41 and 38.

An oil circulating system includes a head tank 42 from which oil may flow by gravity through a line 43 into the stern tube chamber 10 through the inlet 44. Oil leaving the stern tube chamber flows through a line 45 into a sump tank 46. A pump 47 driven by a motor 48 maintains circulation in the stern tube by constantly returning oil from the sump, through line 49, to the head tank. A vent pipe 50 allows air to be vented from the oil chamber 12. A pipe 55 vents the head tank to atmosphere.

The elevated head tank creates a head which maintains a head pressure on the oil within the oil chamber 12 of the stern tube. This pressure is above the sea water pressure at the level of the stern tube, and thus the pressure difference across the forward seal can exceed the safe limitation for lip seals, particularly in deep drafted ships, and can result in undesired deformation of the seal ring 25.

As an important feature of the present invention the annular pocket 32 for the lip seal 25 has an outlet 51 which is connected by a line 52 with a small pump 53, the latter having a discharge line 54 which is connected with the line 44 to return oil to the stern tube chamber. A pressure regulating valve 56 is connected in parallel with the pump 53 to maintain a constant pressure differential between the annular pocket 32 and atmospheric pressure in the shaft alley.

OPERATION

In operation, the dimensions of the floating ring 35, including the amount of its clearance 38 with respect to the liner, are designed to provide a decrease in the pressure of oil in the first annular pocket 32 acting on the lip seal 25. Oil is drawn from the chamber 12 through the annular clearance 41, through the floating ring clearance 38, into the annular pocket 32 and out of the pocket by way of the line 52. This action is caused by the pump 53, which pump can have a fixed flow rate, relative to the pressure in the chamber 12 and other conditions to maintain a reduced oil pressure in the first annular pocket 32 to provide a reduced pressure difference (within limits for satisfactory seal operation) across the seal ring 25. The flow rate of the pump 53 is such as to withdraw oil through the line 52 at a sufficient rate to prevent the build-up of excessive oil pressures on the seal 25 such as would otherwise cause distortion. Such distortion is to be avoided as it creates large contact areas which generate increased amounts of heat, raise the seal operating temperature, and cause deterioration of the elastomer. Desirably, the pressure in the first annular pocket 32 is such as to maintain the line contact at 31 between the seal lip and liner 20. In lieu of having a pump with a fixed rating to suit average condition, the pump 53 may be of the type in which the flow rate may be varied by either manual or automatic means to maintain a reduced pressure within the chamber 32 to provide for a satisfactorily low pressure difference across sealing element 25.

The oil removed by the pump 53 is continuously returned to the stern tube oil chamber 12 by way of the return line 54. The oil in the main circuit for the chamber 12 is continuously circulating through the return line 45, sump 46, line 49, head tank 42, and return lines 43 and 44, this circulation being dependent upon operation of the main pump 47.

The pressure regulating valve 56 comes into play when there are changes in pressure of the oil in the stern tube chamber, when there are changes in the temperature of the oil, or when there are changes in the speed of rotation of the tail shaft. As the speed of the tail shaft increases, the ring 35 tends to become better centered to reduce the flow of oil through the clearance space, thus reducing the pressure in chamber 32. If merely a fixed rate pump is relied upon to circulate the oil from the chamber 32 back to the stern tube chamber, it would not compensate for differences in pressure or flow caused by the above-noted factors. But, with pressure regulating valve 56 by-passing pump 53, the above-noted reduction of pressure in chamber 32 will cause part of the oil from pump 53 to return to chamber 32 through valve 56, thereby reducing the amount of oil flow to the stern tube oil chamber. If the pressure in chamber 32 increases, the amount of oil flowing through valve 56 will be reduced, thereby increasing the amount of oil flow to the stern tube oil chamber. This maintains the pressure in chamber 32 constant in spite of changes which may occur in the stern tube oil chamber due to temperature, shaft speed, or pressure changes from the draft of the ship.

FIG. 3 shows the interior of valve 56. The valve includes a diaphragm 57 which is exposed on its lower surface to the fluid pressure of port 58 through a duct 59 and is exposed on its upper surface to the ambient atmosphere through an air vent 60. A spring 61 bears against a face-plate 62 on the upper surface of diaphragm 56. The spring 61 is adjustable by means of set screw 63.

The other side of diaphragm 57 is connected by means of a shaft 64 to a spring loaded valve member 65 which controls the flow of fluid between the ports 58 and 66. Valve member 65 is biased by a fixed spring 67, whereby the amount of fluid passing through the valve depends jointly on the pressure of adjustable spring 61 and the fluid pressure in port 58.

When the oil pressure of port 58 increases, the oil flow between the ports 58 and 66 decreases, and when the oil pressure of port 58 decreases, the oil flow between the ports 58 and 66 increases, which regulates the pressure at port 58 to provide the above-noted stabilizing effect.

It is to be understood that we do not desire to be limited to the exact details of construction shown and described, for obvious modifications will occur to a person skilled in the art.

What is claimed is:

1. A sealing assembly for effecting a seal adjacent an annular liquid chamber around a rotatable member, said assembly including an annular casing having a first annular pocket within which an annular lip seal is supported, the improvement comprising means providing a restricted inlet between said liquid chamber and said annular pocket, a liquid conduit connecting said annular pocket with said liquid chamber, a pump in said conduit arranged to pump liquid from said annular pocket to thereby draw liquid from said liquid chamber through said restricted inlet into and out of said annular pocket to provide a liquid pressure in said pocket which is lower than the liquid pressure in the liquid chamber, and pressure regulator means having one end connected to said liquid conduit on the suction side of said pump and having the other end connected to said liquid conduit on the pressure side of said pump arranged to permit the regulated flow of part of the liquid from the pressure side of said pump back to said annular pocket to thereby maintain a constant pressure in said annular pocket.

2. A sealing assembly as claimed in claim 1 in which the means which provides a restricted inlet includes a second annular pocket in said casing, and a floating ring within said second pocket having an internal diameter to provide a restricted clearance space between the floating ring and rotatable member.

3. A sealing assembly as claimed in claim 2 in which there is an annular shoulder between the first annular pocket and the second annular pocket against which the floating ring is urged by the liquid pressure in the liquid chamber.

4. A sealing assembly as claimed in claim 1 in which the rotatable member is the tail shaft of a ship and in which the liquid chamber is the stern tube oil chamber containing oil under pressure, and in which the means for drawing liquid out of the first annular pocket maintains a reduced pressure adjacent the seal to prevent excessive distortion thereof.

5. A sealing assembly as claimed in claim 1 in which the pump withdraws liquid from the annular chamber at a sufficient rate to maintain the pressure in the annular pocket substantially below the pressure in the liquid chamber.

6. A sealing assembly as claimed in claim 2 in which the rotatable member is the tail shaft of a ship and in which the liquid chamber is the stern tube oil chamber containing oil under pressure, and in which the means for drawing liquid out of the first annular pocket maintains a reduced oil pressure adjacent the seal to prevent excessive distortion thereof.

7. A sealing assembly as claimed in claim 8 in which there is a pump for drawing oil out of the first annular pocket and for causing its return to the liquid chamber, and in which the pump withdraws the oil at a sufficient rate to maintain the pressure in the annular pocket substantially below the pressure in the stern tube oil chamber.

8. A sealing assembly as claimed in claim 1 in which the restricted inlet between the liquid chamber and the annular pocket is an annular inlet.

9. A sealing assembly as defined in claim 1 wherein said pressure regulator means comprises a pressure regulating valve to automatically maintain a constant pressure in said annular pocket.

* * * * *